US005251289A

United States Patent [19]

Fidler et al.

[11] Patent Number: 5,251,289

[45] Date of Patent: Oct. 5, 1993

[54] PRINTER WITH IMPROVED DATA ENTRY

[75] Inventors: Thomas D. Fidler, Springboro; Patricia A. Schaeffer, Spring Valley, both of Ohio

[73] Assignee: Monarch Marking Systems, Inc., Miamisburg, Ohio

[21] Appl. No.: 296,182

[22] Filed: Jan. 11, 1989

[51] Int. Cl.[5] .............................................. G06K 15/00

[52] U.S. Cl. ........................................ 395/112; 380/55

[58] Field of Search ................ 364/518, 519; 346/154; 395/101, 113, 112, 115, 116, 155, 161, 164, 275, 425; 340/748-801, 825.31; 341/22-26; 380/3-5, 55, 59

[56] References Cited

U.S. PATENT DOCUMENTS 4,656,602 4/1987 Berkland et al. .................. 364/519
4,786,194 11/1988 Ueno .................................. 364/519

*Primary Examiner*—Arthur G. Evans

*Attorney, Agent, or Firm*—McAndrews, Held & Malloy, Ltd.

[57] ABSTRACT

A printer is shown which employs an improved data entry technique wherein a predetermined set up time is established for entering semi-fixed information, that is, information which changes but relatively infrequently. A bit map image of the semi-fixed information is created only once after the printer is initialized so that only a bit map image of variable information need be created each time the printer is operated to print. The printer further includes a limited keyboard for the generation of control signals to which the printer's processor responds differently depending upon the mode of operation of the printer. In one mode of operation, the printer's processor is responsive to the actuation of one key to control a display and the entry of data into a memory for printing. In a second mode of operation, however, the printer's processor is responsive to the actuation of that same key to control the movement of paper stock with respect to a print head.

33 Claims, 15 Drawing Sheets

CITY
NORWALK
97
82
(NEXT) (ENTER) (SET) (TEST)
96

STATE
OH
98
82
(NEXT) (ENTER) (SET) (TEST)
96

ZIP
48ØØØ
99
82
96
(NEXT) (ENTER) (SET) (TEST)

READY
TC=99,999
82
96
(NEXT) (ENTER) (SET) (TEST)

DATE
OCT 21, 87
100
82
96
(NEXT) (ENTER) (SET) (TEST)

PRINTER WITH IMPROVED DATA ENTRY

TECHNICAL FIELD

The present invention relates to a printer for printing information on a web of record members and more particularly to such a printer having a predetermined set up time for entering semi-fixed information so that a bit map image of the semi-fixed information need only be created once after the printer is initialized and not every time that the information is printed as is required for variable information, the printer further including a limited keyboard for generating control signals to which the printer's processor responds differently depending upon the mode of operation of the printer.

BACKGROUND OF THE INVENTION

Printers are known for printing information on labels or the like wherein some of the information is fixed and never changes and other information such as date or price is variable. To generate a label, a bit map image of the information to be printed is created. Known printers treat all information which can change as variable information even if the information changes infrequently. Each time a label is printed or any variable information is entered into the printer, the bit map image of all of the variable information is recreated even though some of the variable information remains the same from label to label. This is inefficient. Further, printers typically include full alphanumeric keyboards or keypads for entering data and commands. Such keyboards are costly and require space. In applications where it is desirable to minimize the size of the printer, such keyboards are undesirable.

SUMMARY OF THE INVENTION

In accordance with the present invention, the disadvantages of prior printers have been overcome. The printer of the present invention employs an improved data entry technique in which a predetermined set up time is established for entering semi-fixed information so that a bit map image of such semi-fixed information need only be created once after the printer is initialized and not every time the information is printed as is required for variable information. The printer further includes a limited keyboard for the generation of control signals to which the printer's processor responds differently depending upon the mode of operation of the printer.

More particularly, the printer includes a keyboard or the like that is actuable by a user for entering at least one user command and data; a first memory for storing data representing information to be printed; and a processor for controlling the storage of new data to be printed in the memory in response to the receipt of a particular user command within a predetermined period of time of the powering up or initialization of the printer. A bit map image of the information represented by the data stored in the first memory and entered during the set up period is created in a second memory only once after the powering up or initialization of the printer.

The data representing information to be printed is grouped in three categories, fixed data, semi-fixed data and variable data. Fixed data represents that information which never changes such as the serial number of the printer. Semi-fixed data represents that data which may change but changes relatively infrequently so that it is more efficient to limit the time during which the semi-fixed information may be entered and stored in the printer. Because the semi-fixed data may only be entered at one particular time, a bit map image of the semi-fixed information need only be created once after the data is entered. This is compared to variable data that represents information which changes frequently such as price information. Variable data may be entered at any time after the printer is initialized and ready to print, wherein a bit map image of the variable information is created every time variable data is entered.

The printer of the present invention further includes only a limited number of keys on a keyboard or keypad. The printer's processor is responsive to the actuation of one key in a first mode of operation to control a display and the entry of data into the first memory for printing. In a second mode of operation the printer's processor is responsive to the actuation of that same key to control the movement of the web of record members with respect to the print head that prints information on the web of record members. In order to enter data or control the display with such a limited number of keys, the printer of the present invention employs wrap around data lists stored in a memory wherein the data lists are scrolled through by actuating one of a limited number of keys.

These and other objects, advantages and novel features of the present invention, as well as details of an illustrated embodiment thereof, will be more fully understood from the following description and the drawing.

BRIEF DESCRIPTION OF THE DRAWING

FIG. 21 is a communications routine called by the system routine in FIG. 13*a.

DESCRIPTION OF THE PREFERRED EMBODIMENT

Figures 1, 2:
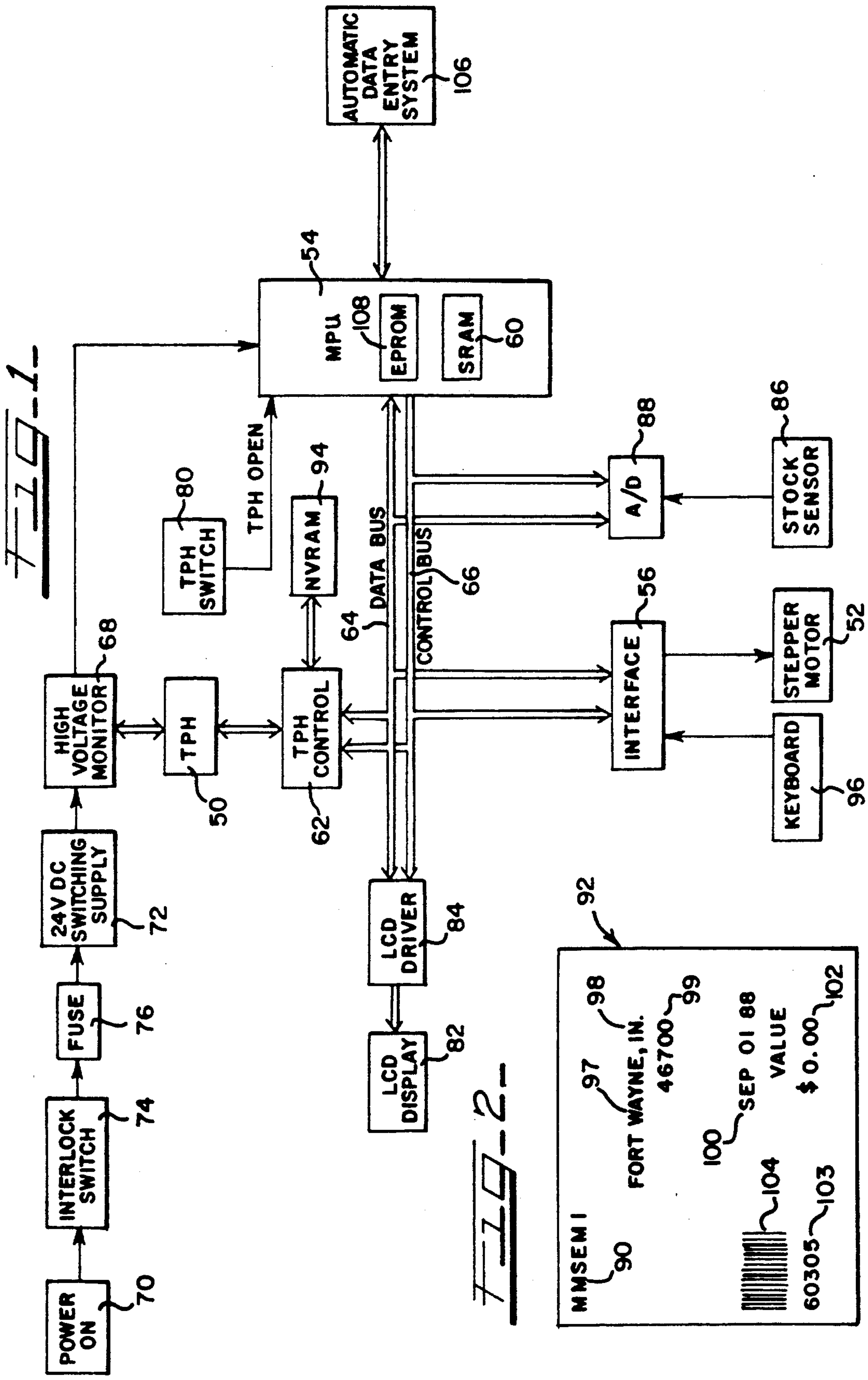
FIG. 1 is a block diagram of the printer of the present invention.
FIG. 2 is a front view of a stamp generated by the printer shown in FIG. 1.

A printer employing the present invention is shown in FIG. 1 for printing information on a stamp as shown in FIG. 2. Details of the mechanics of the printer are shown in the copending U.S. patent application of Paul H. Hamisch Jr. et al, Ser. No. 07/296,171, filed concurrently herewith and incorporated herein by reference. Although the present invention is described for a stamp printer, it is applicable to other types of printers that print characters in various fonts and formats on a web of record members such as a hand-held labeler that prints labels or a table top printer that prints tags or the like.

The printer includes a thermal print head 50 for printing information on a web of record members such as paper stock on which stamps are carried. The paper stock is moved with respect to the thermal print head 50 by a stepper motor 52 controlled by a microprocessor 54 through an interface 56. A bit mapped image of information to be printed on a stamp is coupled from a static random access memory, SRAM 60 of the microprocessor 54 to the thermal print head 50 through a thermal print head control 62 coupled to the microprocessor 54 by data and control buses 64 and 66. The thermal print head 50 is powered by +24 volts DC coupled thereto by a high voltage monitor 68 that also converts the +24 volts from a +24 volt DC switching supply 72 to a +5 volt level so as to be used by the logic devices of the printer. The high voltage monitor 68 further detects imminent power loss so as to advise the microprocessor 54 thereof. A power on switch 70 couples AC power to the +24 volt DC switching supply 72 through an interlock switch 74 and a fuse 76 wherein the interlock switch 74 cuts off AC power to the switching supply 72 if the printer is opened. The printer further includes a thermal print head switch 80 which is a mechanical limit switch that senses whether the thermal print head 50 is pulled away from the paper stock. If it is, the thermal print head switch 80 provides a TPH open signal to the microprocessor 54 which responds thereto by controlling an LCD display 82 through a driver 84 to display various prompts to the user as discussed in detail below. The printer also includes a stock sensor 86 that is coupled to the microprocessor 54 through an analog-to-digital converter 88 wherein the stock sensor includes an LED and phototransistor for providing position feedback information regarding the paper stock to the microprocessor 54.

The information that is printed by the printer of the present invention is represented by three types of data, fixed data, semi-fixed data and variable data. Fixed data represents that information which never changes such as the serial number 90 of the printer as shown on the stamp 92 in FIG. 2. Fixed data is stored in a non-volatile random access memory NVRAM 94 that is coupled to the microprocessor 54 through the thermal print head control 62.

Semi-fixed data represents that data which may change but changes relatively infrequently so that it is efficient to limit the time during which the semi-fixed information may be entered and stored in the printer. More particularly, the semi-fixed data represents that information which is entered during the set up mode of the printer as described in detail below so that a bit map image of the semi-fixed data need only be created once. During the set up mode, the semi-fixed information is entered by means of a keyboard 96 that is coupled to the microprocessor 54 through the interface 56. When the semi-fixed information is entered via the keyboard 96, data representing the semi-fixed information is stored in the NVRAM 94. Thereafter, a bit map image of the fixed and semi-fixed information stored in the NVRAM 94 is created in the static RAM 60. As shown in FIG. 2, the semi-fixed information that is printed on the stamp 92 includes the name of the city 97 and state 98 identifying the place of mailing, the zip code 99 of the place of mailing and the date 100.

Variable data represents information that changes frequently such as with each stamp that is printed. For example, the monetary amount 102 of postage as well as the destination zip code 103 and the bar code representation 104 thereof constitute variable information. The data representing the variable information to be printed on the stamp 92 may be entered at any time after the printer is initialized and ready to print. The variable data is entered to the printer via an automatic data entry system 106 that includes its own processor as well as scales and the like for determining the weight of a parcel for which postage is requested so as to provide the monetary amount of postage to the microprocessor 54. The automatic data entry system 106 further includes a keyboard or the like for entering the zip code identifying the destination of the parcel. The variable data is downloaded from the automatic data entry system 106 to the microprocessor 54 which is responsive thereto to create in the SRAM 60 a bit map image of the variable information represented by the variable data. As described below, the downloading of variable data from the automatic data entry system 106 to the microprocessor 54 represents a request to print a stamp.

The microprocessor 54 controls various operations of the printer in response to software that is stored in an EPROM 108, the software being illustrated in the flow charts of FIGS. 12-22. More particularly, the microprocessor 54 is responsive to the actuation of one of a limited number of keys comprising the keyboard 96 including a NEXT key 110, an ENTER key 111 and a SET key 112 to control different printer operations depending upon the mode of operation of the printer. In the set up mode, the microprocessor 58 is responsive to the actuation of the NEXT, ENTER and SET keys 110-112 to control the LCD display 82 and the storage of semi-fixed data in the NVRAM 94. In a LOAD mode, the microprocessor 54 is responsive to the actuation of the NEXT, ENTER and SET keys 110-112 to control the movement of paper stock with respect to the thermal print head 50.

Figures 3, 4, 5, 6, 7:
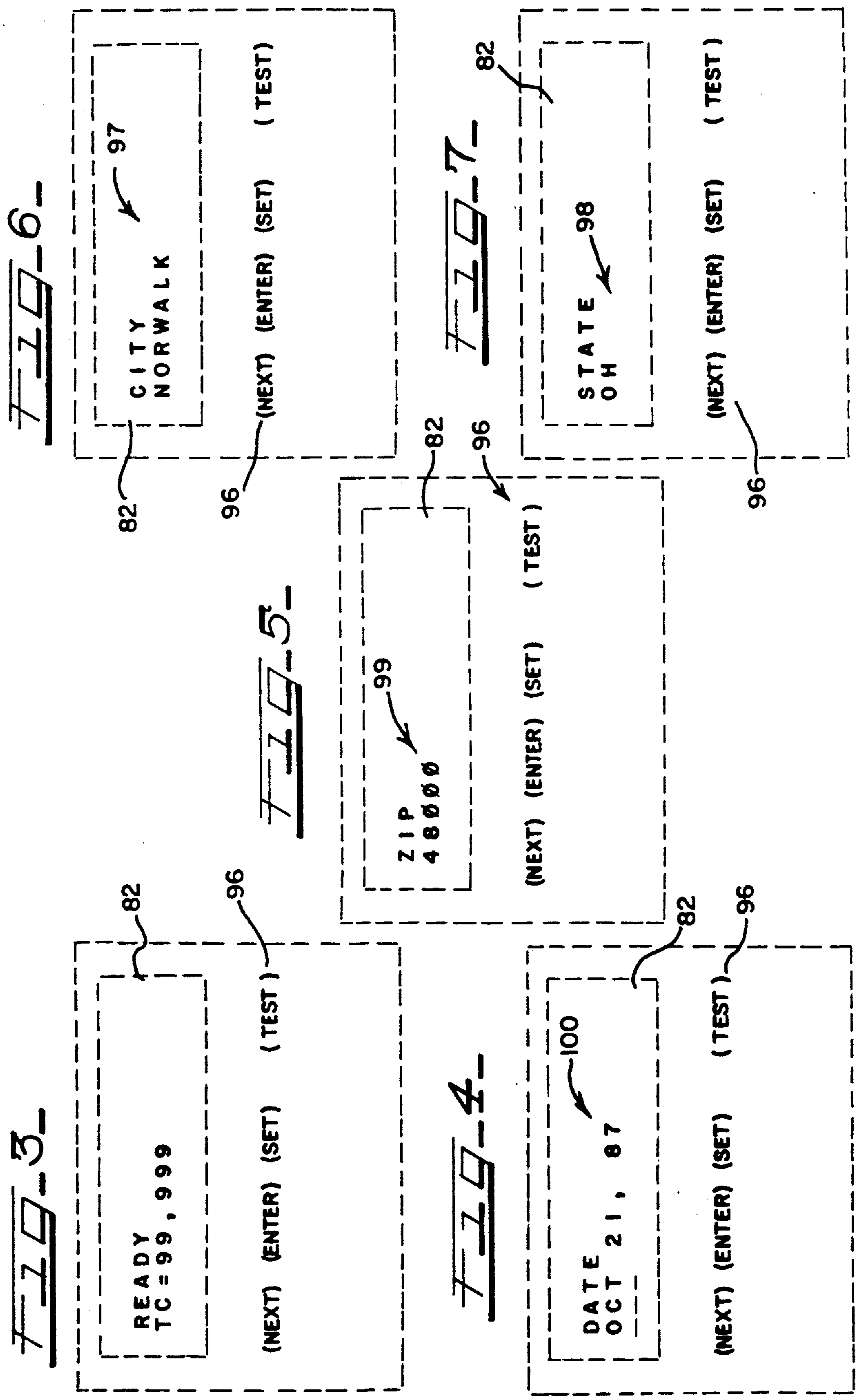
FIG. 3 is an illustration of the default display and keyboard of the printer shown in FIG. 1.
FIG. 4 is an illustration of the date data entry display and keyboard of the printer shown in FIG. 1.
FIG. 5 is an illustration of the zip code data entry display and keyboard of the printer shown in FIG. 1.
FIG. 6 is an illustration of the city data entry display and keyboard of the printer shown in FIG. 1.
FIG. 7 is an illustration of the state data entry display and keyboard of the printer shown in FIG. 1.
Figure 10:
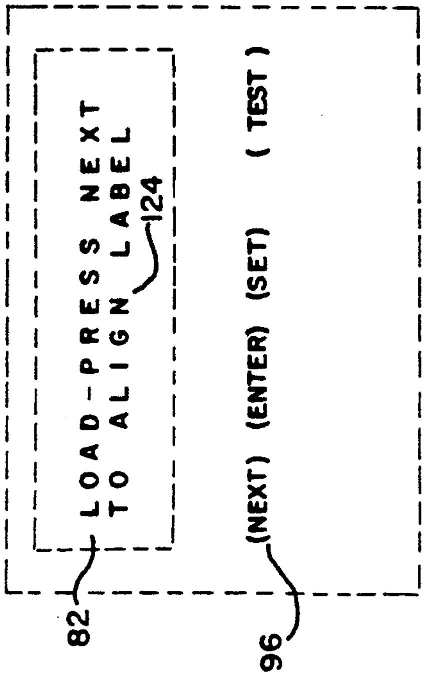
FIG. 10 is an illustration of a third load prompt display for the printer shown in FIG. 1.
Figure 11:
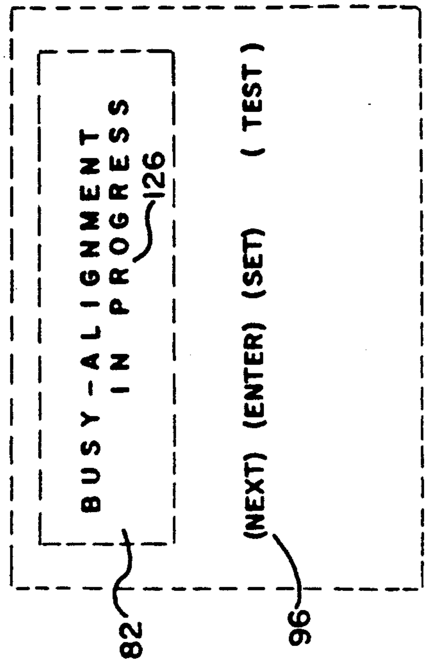
FIG. 11 is an illustration of a fourth load prompt display for the printer shown in FIG. 1.
Figure 8:
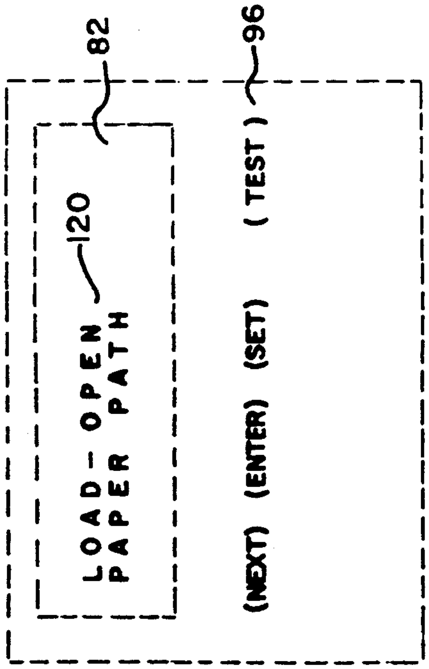
FIG. 8 is an illustration of a first load prompt display for the printer shown in FIG. 1.
Figure 9:
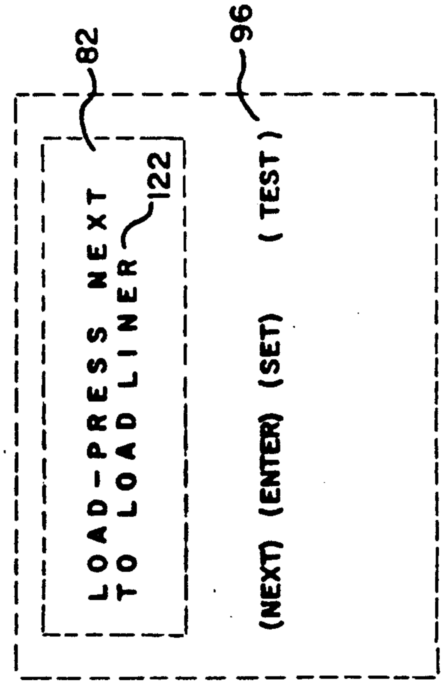
FIG. 9 is an illustration of a second load prompt display for the printer shown in FIG. 1.

When the printer is initialized, the microprocessor 54 controls the LCD display 82 to display a default display 114 as shown in FIG. 3. In order to enter semi-fixed data as described in detail below, the user presses the SET key 112 within a predetermined time of the initialization or powering up of the printer so as to enter the set up mode. Upon actuation of the SET key 112 within-the predetermined period of time, the microprocessor 54 controls the LCD display 82 to display the date information 100 represented by data previously stored in the NVRAM 94. If a user desires to change or modify the date information 100, the user presses the NEXT key 110 to scroll through a wrap around, month data list stored in the EPROM 108. If the user presses the next key 110 for only a short amount of time the microprocessor 54 increments to the next month in the data list and controls the LCD display 82 to display that ne%t month. If, however, the user holds the NEXT key 110 down, the microprocessor rapidly scrolls through each month in the list until the user releases the key when the selected month is displayed. In order to save a selected month, the user presses the ENTER key 111 to which the microprocessor 54 responds by storing in the NVRAM 94 the selected month displayed on the display 82 and by moving a cursor 116 to the next field which represents the day of the month. A wrap around data list representing the days of the month is stored in the EPROM 108, the microprocessor 54 being responsive to the actuation of the NEXT key 110 to scroll through the day wrap around data list until the user presses the ENTER key 111. In response to the actuation of the ENTER key 111 with the cursor 116 pointing to the day field, the microprocessor 54 stores the selected day information in the NVRAM 94 and moves the cursor 116 under the tens digit year field, which is set by scrolling through a numeric, 0 to 9, data list in response to the actuation of the NEXT key 110. Upon actuation of the ENTER key, the microprocessor 54 stores the selected tens digit of the year and moves the cursor under the ones digit year field. The microprocessor 54 is then responsive to the subsequent actuation of the NEXT key to scroll through the numeric data list until the selected ones digit of the year is displayed. After each field of the date information 100 is stored, the user may increment the display 82 to the next group of semi-fixed information such as the place of mailing zip code 99, by actuation of the set key 112.

The zip code 99 of the place of mailing as shown in FIG. 5 includes five numeric fields which may be set by actuation of the NEXT and ENTER keys 110 and 111 as described above for the date information using the numeric data list. After the zip code 99 of the place of mailing is entered and stored in the NVRAM 94 the microprocessor 54 is responsive to the actuation of the SET key 112 to increment to the next group of semi-fixed data, the name of the city of the place of mailing and controls the LCD display 82 to display the city information 97. Each letter of the city information 98 represents a field that may be changed by scrolling through an alpha city wrap around data list stored in the EPROM 108. The city data list may include, for example, all of the capital letters in the alphabet as well as all of the small letters in the alphabet and certain punctuation marks such as an apostrophe, comma, dash, period and exclamation mark so that the name of any city may be entered. Each field, that is letter or punctuation mark forming the name of the city is entered and stored in response to actuation of the NEXT and ENTER keys 110 and 111. Upon actuation of the SET key 112, the LCD display 82 is controlled by the microprocessor 54 to display the state information 99. The state information 99 is formed of two fields defining the state of the place of mailing. The wrap around data list associated with the state information 99 and stored in the EPROM 108 may include, for example, only capital letters. Each of the two fields associated with the state information 99 may be entered and stored in response to actuation of the NEXT and ENTER keys 110 and 111 as discussed above. Upon actuation of the SET key, the microprocessor 54 controls the LCD display 82 to display the default display 114 as shown in FIG. 3 signaling the completion of the set up mode.

In the load mode of operation as depicted with reference to FIGS. 8-11 and described in detail below, the microprocessor 54 is responsive to the actuation of the NEXT key 110 to move the paper stock in a forward direction past the thermal print head 50. The microprocessor 54 is responsive to the actuation of the ENTER key 111 to move the paper stock in a reverse direction with respect to the thermal print head 50. The microprocessor 54 is responsive to the actuation of the SET key 112 to set the position of the paper path as described in detail below with respect to FIG. 16.

Whenever the printer runs out of paper or the paper becomes misaligned or out of synchronization, the microprocessor 54 causes the display 82 to depict a load prompt 120 which signals the user to open the paper path. Thereafter, the microprocessor 54 causes the display 82 to prompt for the loading of the paper with a prompt message 122 that instructs the user to press the NEXT key 110 to load the paper stock liner. When the NEXT key 110 is held down, the microprocessor 54 controls the stepper motor 52 to advance the paper stock liner in a forward direction to allow the user to feed the liner into a liner take up area. After the liner is loaded, the microprocessor 54 may prompt the closing of the thermal print head switch. When the thermal print head switch is closed, the microprocessor 54 causes the LCD display 82 to display a prompt message 124 to instruct the user to press the NEXT key 110 to advance the liner on the takeup spool so that the paper may be aligned. During the alignment process, the microprocessor 54 causes the LCD display 82 to display a prompt a message 126 which advises the user that the alignment process is in progress. If the paper alignment process is successfully completed, the microprocessor 54 causes the display 82 to display the default display 114.

Figure 12:
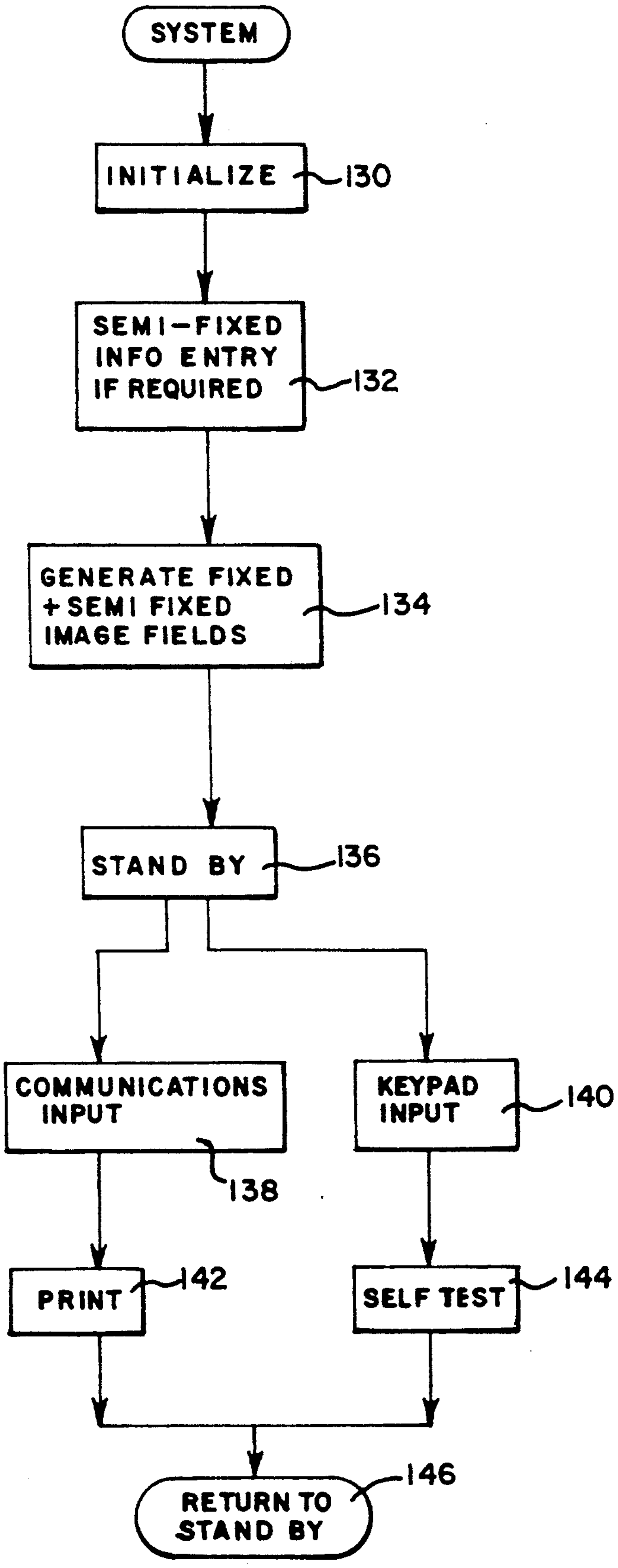
FIG. 12 is a system flow chart illustrating the system operation of the printer shown in FIG. 1.
Figure 20:
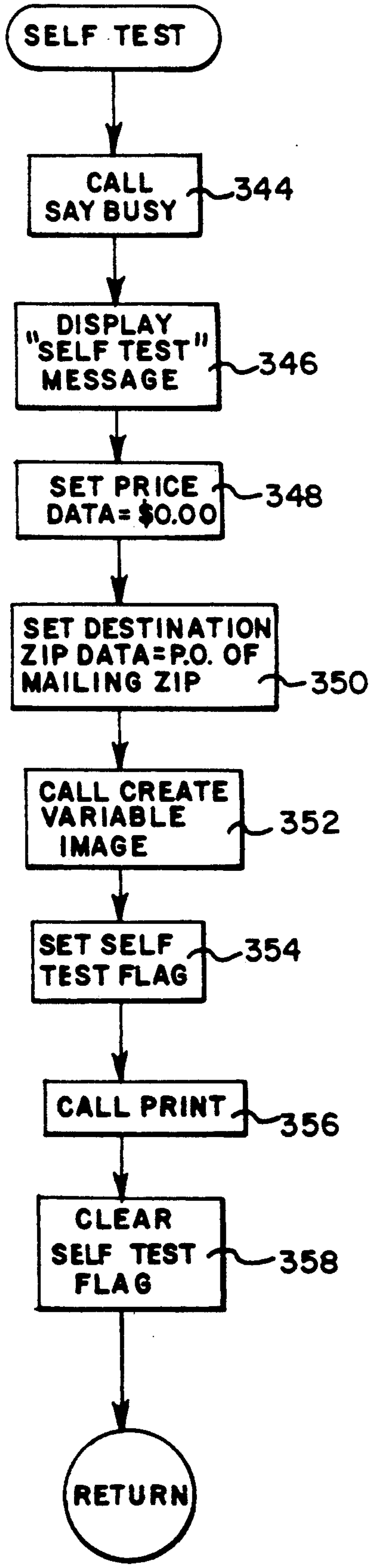
FIG. 20 is a self test routine called by the system routine shown in FIG. 13.

The microprocessor 54 controls the printer according to the generalized system flow chart depicted in FIG. 12 as follows. When power to the printer is first applied, the microprocessor 54 initializes the printer at a block 130. If the SET key 112 of the keyboard 96 is pressed within a predetermined period of time of the powering up or initialization of the printer, the microprocessor 54 at block 132 enters the set up mode to allow semi-fixed information to be entered into the printer. At a block 134, the microprocessor 54 generates a bit map image of the fixed and semi-fixed data fields in the static SRAM 60 from the data representing the fixed and semi-fixed information stored in the NVRAM 94. Thereafter, the microprocessor 54 enters a standby mode at block 136. In response to variable information received from the automatic data entry system 106, the microprocessor 54 at block 138 processes the information received, creating a bit mapped image of the variable information in the SRAM 60 and at block 142 prints a stamp with the information represented by the bit map image of the fixed, semi-fixed and variable information. Thereafter at a block 146, the microprocessor 54 returns to the standby mode at block 136. In the standby mode 136 the microprocessor 54 responds to the actuation of a test key 150 at block 140 by implementing a self test routine 144 as depicted in FIG. 20. Thereafter, the microprocessor 54 at block 146 returns to the standby mode at block 136.

Figure 13:
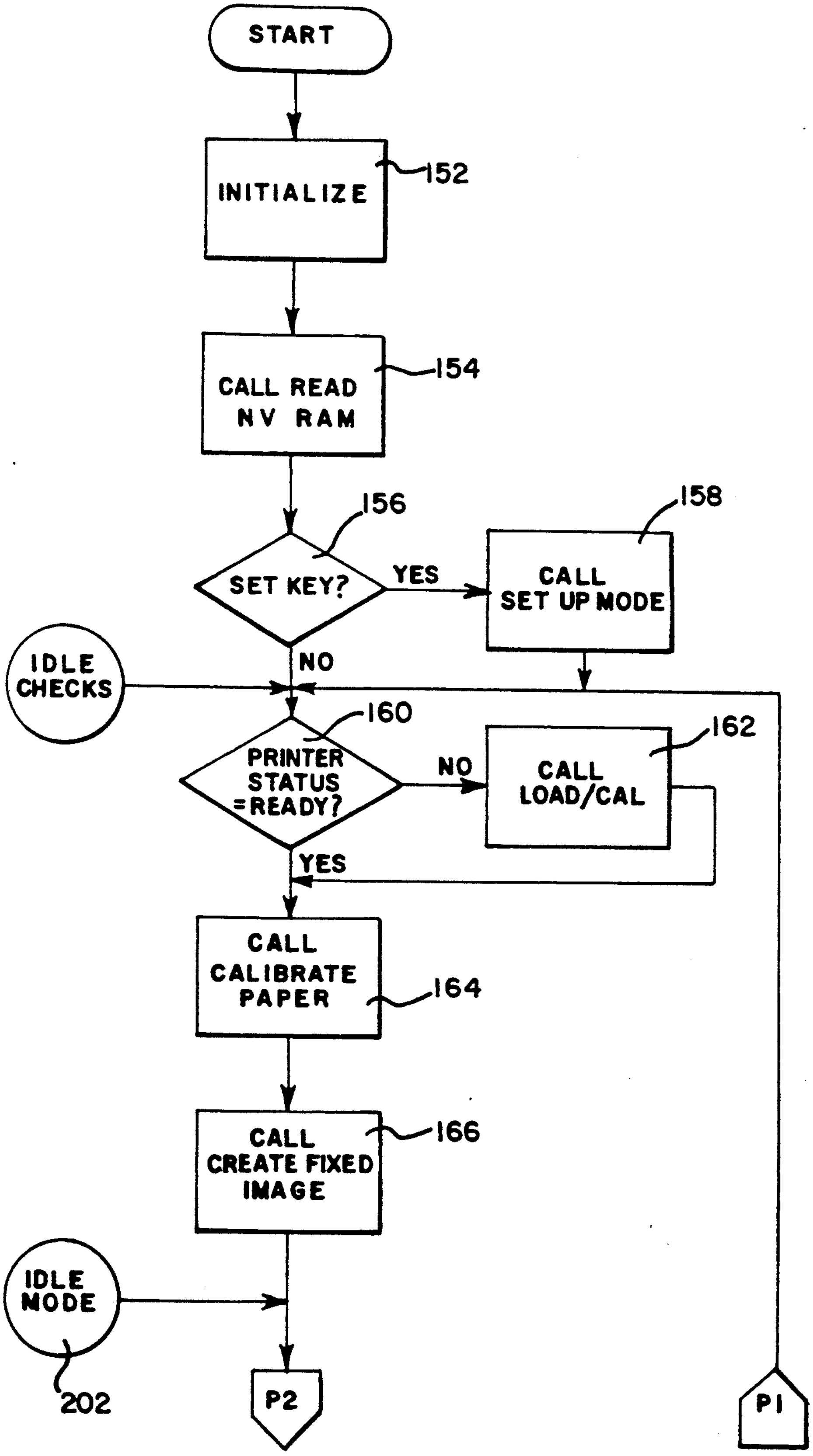
FIGS. 13, 13*a* and 13*b* form a flow chart for the main system routine of the printer shown in FIG. 1.
Figure 13A:
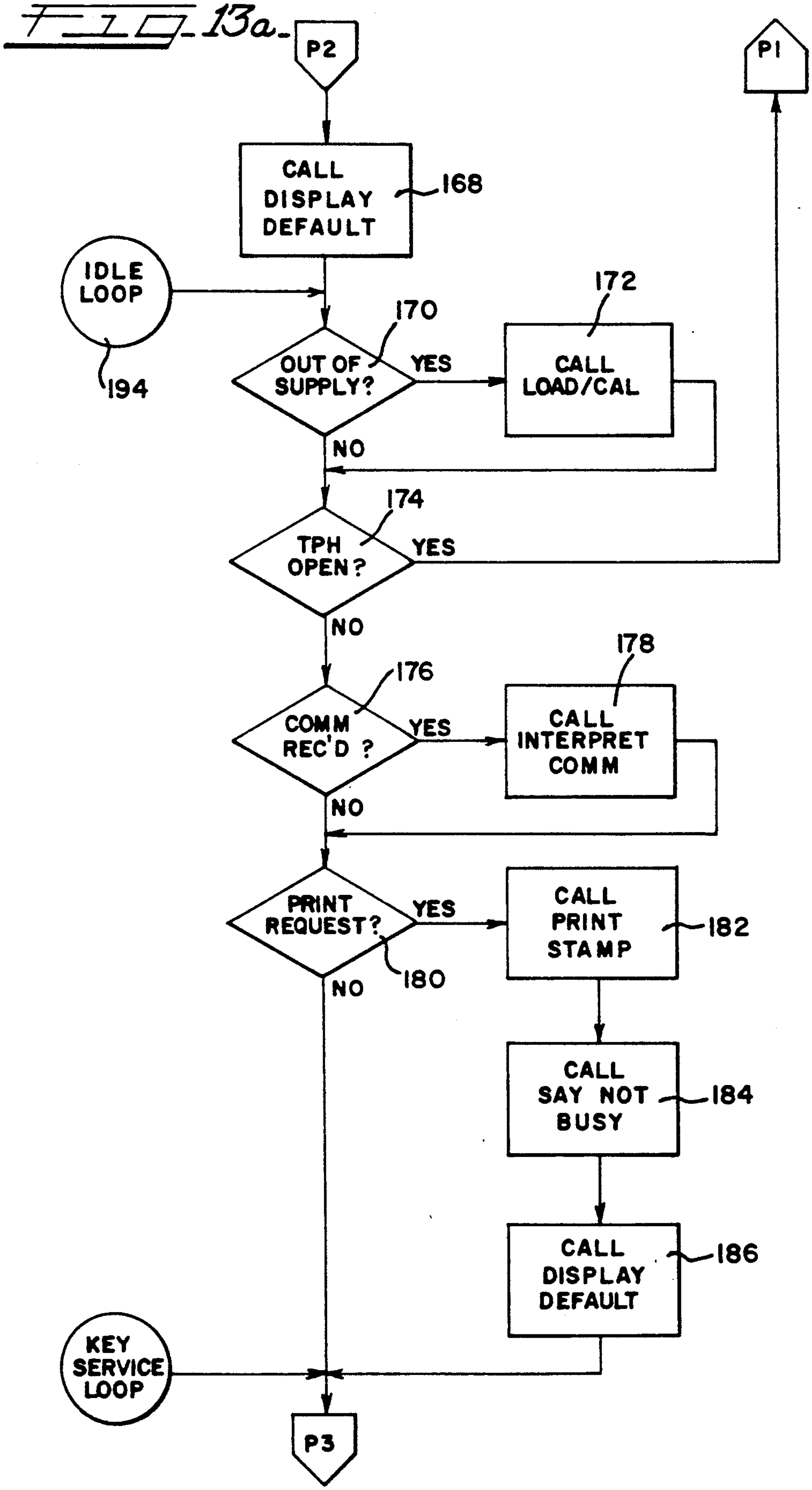
Figure 13B:
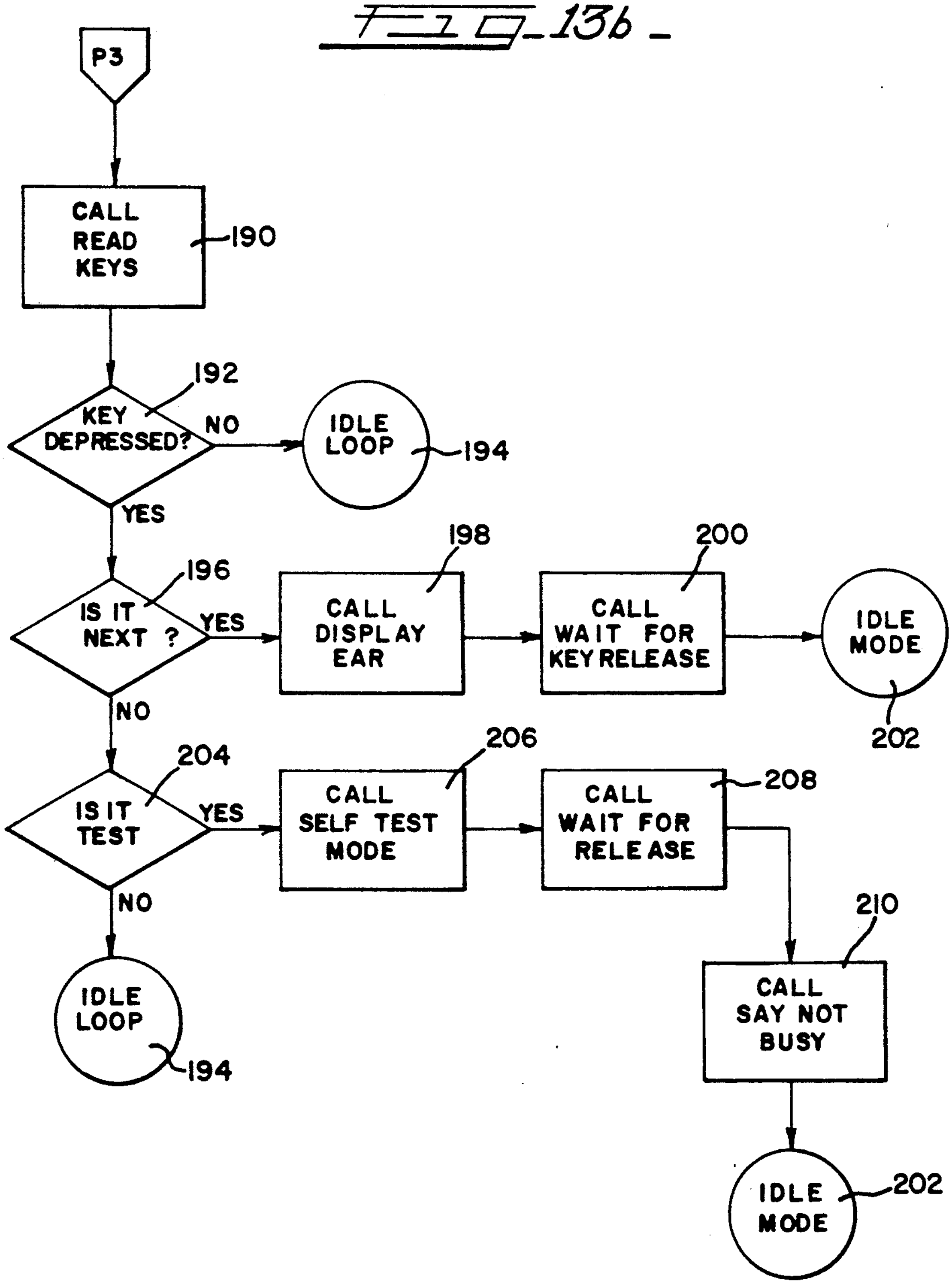

A more detailed illustration of the main system software routine is provided in the flow chart shown in FIG. 13. As described with reference to FIG. 12, upon the application of power to the printer, the microprocessor 54 at a block 152 initializes the printer. At a block 154, the microprocessor 54 calls a subroutine READ NVRAM so as to read out the serial number of the printer, i.e., the fixed data stored in the NVRAM 94, to the static RAM 60. At block 154, the microprocessor 54 further reads out various initialization values from the NVRAM 94. At a block 156, the microprocessor 54 determines whether the SET key 112 has been pressed within a predetermined period of time of the powering up or initialization of the printer at block 152. If the SET key 112 has been pressed, the microprocessor 54 calls the set up mode routine at block 158, the routine being depicted in FIG. 14. After the set up mode is completed at block 158 or if the SET key 112 is not pressed within the predetermined period of time as determined by the microprocessor 54 at block 156, the microprocessor 54 at block 160 determines whether the printer is ready to print a stamp. If it is not, the microprocessor 54 calls the load/calibrate routine at block 162, the routine being depicted in FIG. 16. From blocks 160 or 162, the microprocessor 54 proceeds to block 164 to call a calibrate paper routine which registers the paper. Thereafter at a block 166, the microprocessor 54 calls a create fixed image routine that creates a bit map image of the fixed and semi-fixed information represented by data stored in the NVRAM 94 and the SRAM 60 as depicted by the flow chart in FIG. 17. After the bit map image of the fixed and semi-fixed information is created in the static RAM 60 at block 166, the microprocessor 54 at a block 168 calls a display default routine to cause the LCD display 82 to depict the default display 114. Thereafter, at a block 170, the microprocessor 54 determines whether the printer has run out of paper. If the microprocessor 54 determines at block 170 that the printer is out of paper, the microprocessor 54 calls the load/calibrate routine at block 172. -From blocks 170 or 172, the microprocessor 54 determines whether the thermal print head switch 80 is open at a block 174. If the thermal print head switch 80 is determined to be open at block 174, the microprocessor 54 returns to block 160. If the thermal print head switch 80 is closed, the microprocessor 54 determines at block 176 whether a communication has been received from the automatic data entry system 106. If a communication has been received, the microprocessor 54 at a block 178 calls an interpret communication routine shown in FIG. 21. From blocks 176 and 178, the microprocessor 54 proceeds to block 180 to determine whether there has been a print request and if so, at block 182 the microprocessor 54 calls a print stamp routine as shown in FIG. 18. At a block 184, the microprocessor 54 calls a not busy routine that signals that the printing of a stamp at block 182 has been completed and at a block 186 calls a display default routine to cause the LCD display 82 to display the default display 114. Thereafter, at a block 190, the microprocessor 54 reads the inputs from the keyboard 96 and at block 192 determines whether any of the keys 110, 112 and 150 have been pressed. If not, the microprocessor 54 goes to an idle loop 194 and returns to block 170 to detect the paper supply. If a key has been pressed, the microprocessor 54 determines at block 196 whether the NEXT key 110 has been pressed and if so, the microprocessor 54 at block 198 causes the LCD display 82 to display the contents of an accumulation register. Thereafter, at a block 200, the microprocessor 54 calls a wait for key release routine and at block 202 enters an idle mode returning to block 168 to display the default display 114 on the LCD display 82. If the microprocessor 54 determines at block 196 that the NEXT key 110 was not pressed but that the test key 150 has been pressed as determined at block 204, the microprocessor 54 calls a self test mode routine as shown in FIG. 20. At block 208, the microprocessor 54 calls the wait for release routine and thereafter at a block 210 calls the not busy routine returning to the idle mode at block 202. If, the microprocessor 54 determines that the test key 150 was not actuated at block 204, the microprocessor 54 returns to the idle loop 194.

Figure 14:
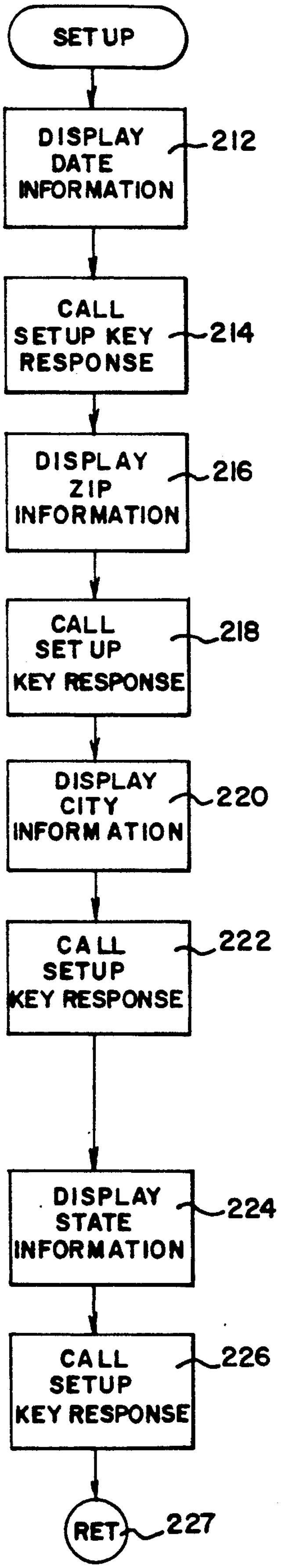
FIG. 14 is a flow chart illustrating the set up routine called by the system routine of FIG. 13.
Figure 15:
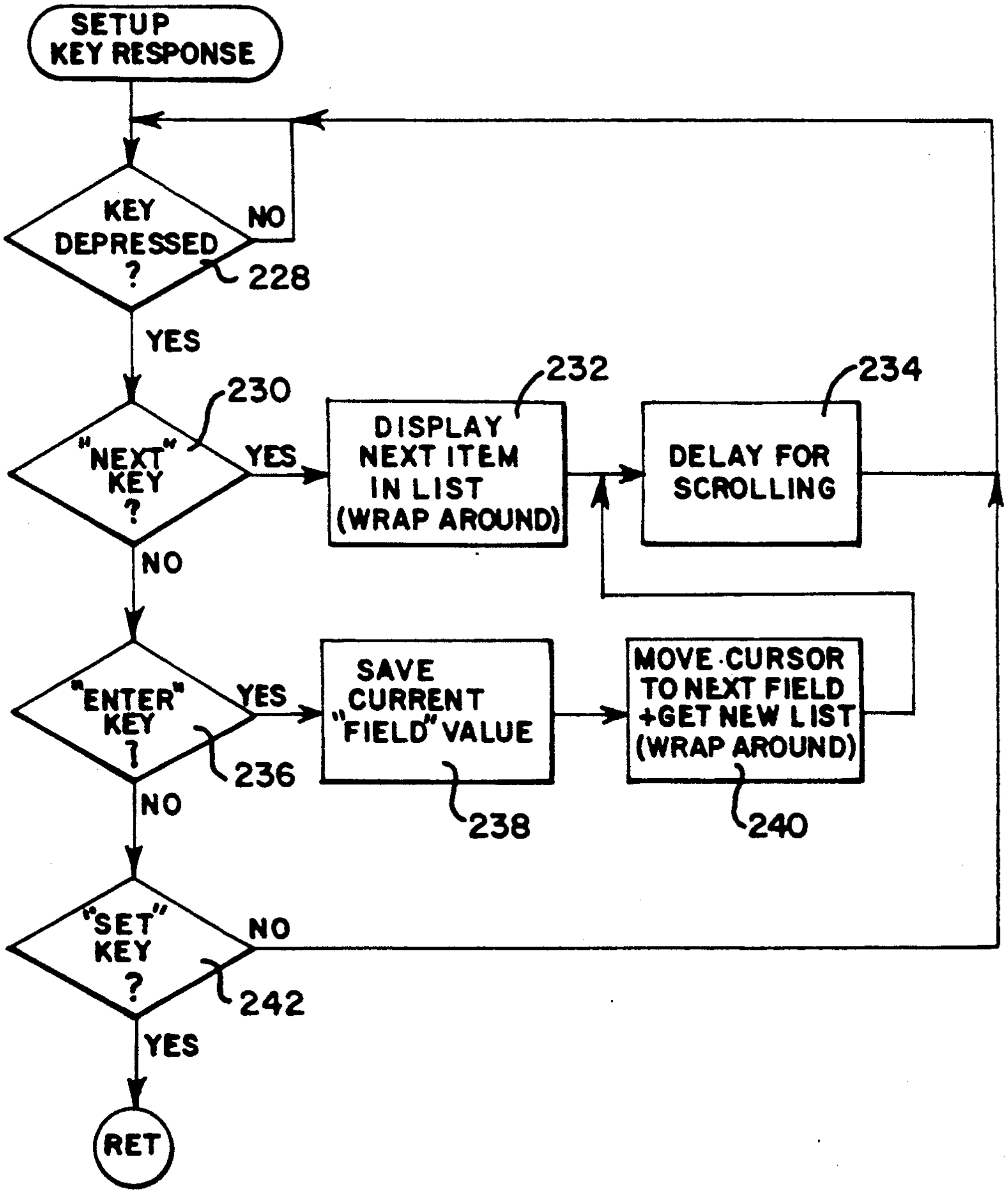
FIG. 15 is a flow chart illustrating a set up key response called by the system routine shown in FIG. 14.

When the set up routine as shown in FIG. 14 is called in response-to actuation of the SET key 112 within a predetermined period of time of the printer power up or initialization, the microprocessor 54 at block 212 first displays the date information 100. Thereafter, at block 214 the microprocessor 54 calls the set up key response as shown in FIG. 15. When the set up key response is called, the microprocessor 54 at a block 228 determines whether a key has been pressed and if so at block 230 the microprocessor 54 determines whether the NEXT key 110 was the key that was pressed. If the NEXT key 110 was pressed, the microprocessor 54 at block 232 displays the next item in the wrap around list associated with the information displayed on the LCD display 82. Thereafter, at block 234 there is a delay for scrolling and the microprocessor returns to block 228. If the NEXT key 110 is not pressed but the ENTER key 111 is pressed, as determined by the microprocessor 54 at block 236, the microprocessor 54 at block 238 saves the current field value and at block 240 moves the cursor to the next field of the group of information displayed and gets the wrap around list associated with that next field. Thereafter, the microprocessor 54 delays for scrolling at block 234 and returns to block 228 to determine whether another key has been pressed. If the SET key 112 has been pressed as determined at block 242 the microprocessor 54 returns to the set-up routine.

When the microprocessor 54 returns to the set up routine from the set up key response routine after storing the date information the microprocessor 54 controls the LCD display 82 to display the zip code information currently stored in the NVRAM 94 at a block 216. Thereafter, at block 218 the microprocessor 54 calls the set up key response shown in FIG. 15 and discussed above so that the zip code information 99 displayed on the LCD display 82 may be changed and new zip code information may be entered into the NVRAM 94. Thereafter, at block 220, the microprocessor 54 controls the LCD display 82 to display the city information 97 and at block 222 calls the set up key response routine so that new city information may be entered and stored. When the microprocessor 54 returns from the set up key response routine after the city information has been stored, the microprocessor at block 224 controls the LCD display 82 to display state information 98 and thereafter calls the set up key response at block 226 to allow the state information 98 to be changed. When the microprocessor 54 returns from the set up key response after the state information has been stored, at a block 227 the microprocessor returns to the system routine and determines at block 150 whether the printer is ready to print. As discussed above, if the printer is not ready to print, the microprocessor 54 proceeds to block 162 to call the load/calibration routine depicted in FIG. 16.

Figure 16:
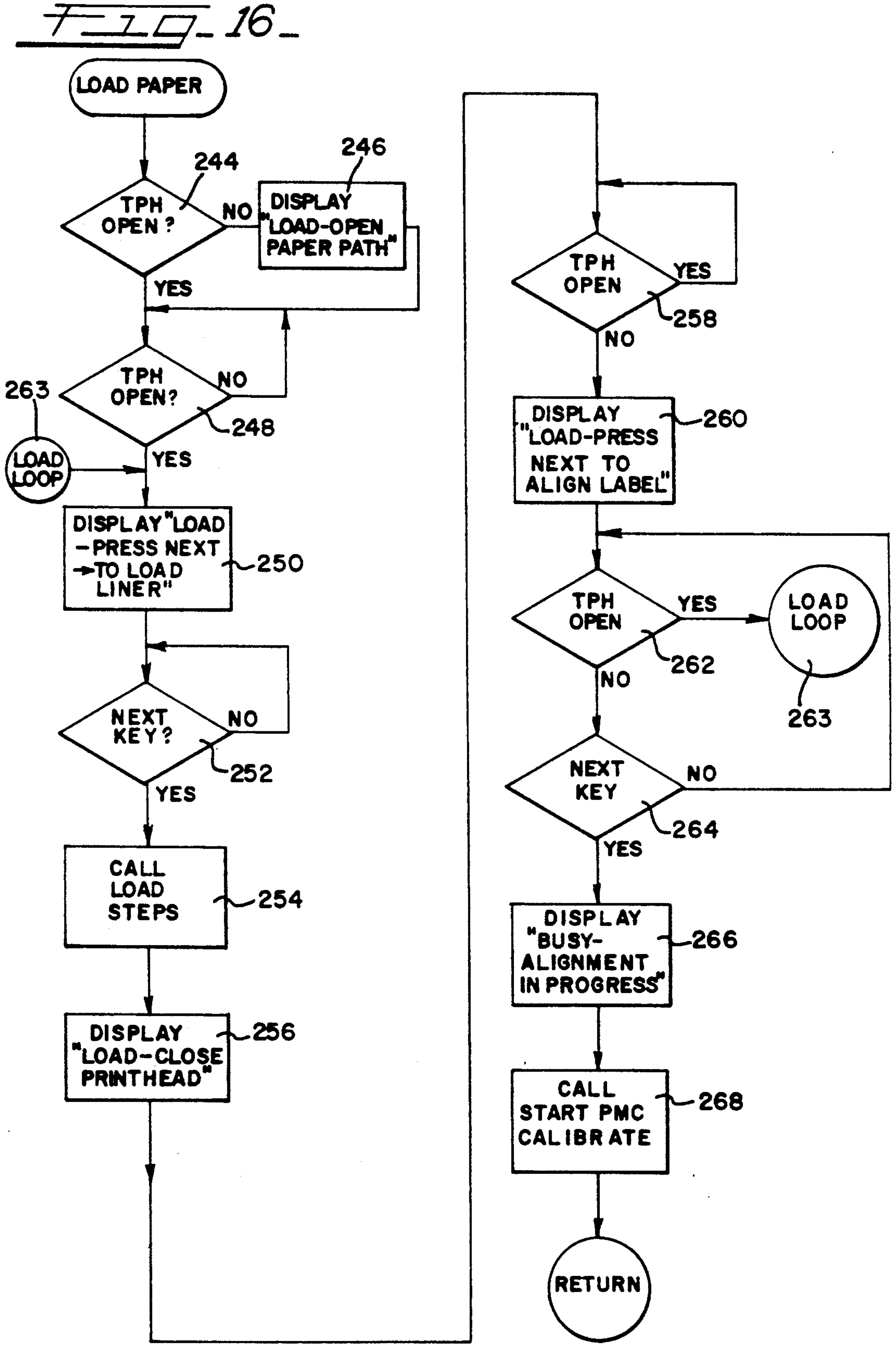
FIG. 16 is a flow chart illustrating a load paper routine called by the system routine shown in FIG. 13.

When the microprocessor 54 enters the load/calibration routine shown in FIG. 16, the microprocessor 54 at block 244 determines whether the TPH switch 80 is open. If the TPH switch 80 is closed, the microprocessor at block 246 controls the LCD display 82 to display the message "LOAD-OPEN PAPER PATH". Thereafter, the microprocessor 54 at block 248 again determines whether the TPH switch 80 is open and if it is proceeds to block 250 to control the LCD display 82 to display the message "LOAD-PRESS NEXT TO LOAD LINER". At block 252 the microprocessor 54 determines whether the NEXT key 110 has been pressed and when it is, the microprocessor 54 proceeds to block 254 to call the load steps routine. The microprocessor 54 in accordance with the load steps routine controls the LCD display 82 to display a message to the user indicating that the NEXT key 110 when pressed will result in forward motion of the paper, that the ENTER key 111 when pressed will cause reverse motion of the paper and that the SET key 112 may be pressed when the paper is sufficiently loaded. Thereafter in response to actuation of the SET key 112, the microprocessor 54 at block 256 controls the LCD display 82 to display the message "LOAD-CLOSE PRINT HEAD". At block 258, the microprocessor 54 determines whether the TPH switch 80 is open and when the switch 80 is closed, the microprocessor 54 proceeds to block 260 to control the LCD display 82 to display the message "LOAD-PRESS NEXT TO ALIGN LABEL". At block 262 the microprocessor again determines whether the TPH switch 80 is open and if it is, the microprocessor 54 returns to the load loop at block 263 from which the microprocessor 54 returns to block 250. If the microprocessor 54 determines at block 262 that the TPH switch 80 is closed, the microprocessor 54 determines at block 264 whether the NEXT key 110 has been pressed and if so, proceeds to block 266. At block 266, the microprocessor 54 controls the LCD display 82 to display the message "BUSY-ALIGNMENT IN PROGRESS". Thereafter, at block 268 the microprocessor 54 calls the start paper motion cycle calibration routine to calibrate the paper as is well known in the art. After the paper calibration routine is complete, the microprocessor 54 returns to the system routine shown in FIG. 13.

Figure 17:
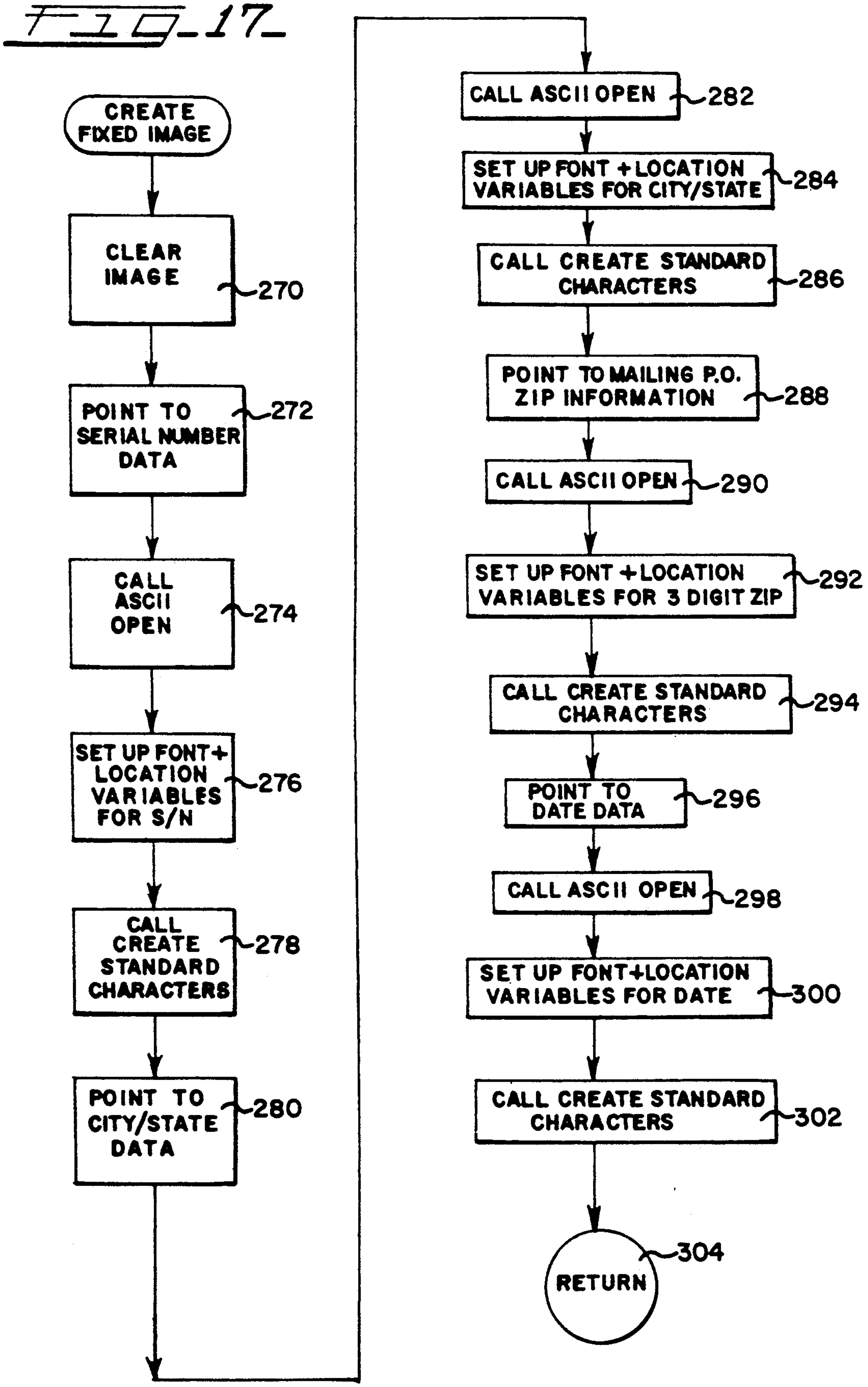
FIG. 17 is a create fixed image routine called by the system routine shown in FIG. 13.
Figure 18:
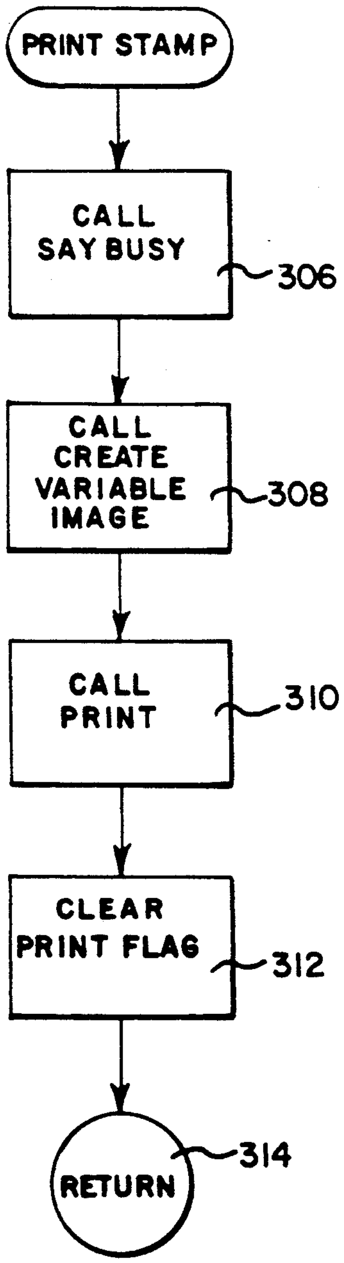
FIG. 18 is a print stamp routine called by the system routine shown in FIG. 13.

When the system routine shown in FIG. 13 calls the create fixed image routine as shown in FIG. 17, the microprocessor-54 at block 270 first clears the image memory portion of the static RAM 60 in which the bit map image of the stamp to be printed is formed. At block 272, the microprocessor 54 points to the serial number data stored in the NVRAM 94 and at block 274 calls an ASCII open routine to open a file. Thereafter, at block 276, the microprocessor 54 sets up the font and location variables for the serial number data, those variables including the number of characters per inch, the spacing between characters, the number of characters in the serial number and the magnification of the characters. Thereafter, at block 278, the microprocessor 54 calls a create standard characters routine which creates a bit map image of the serial number to be printed on the stamp from the font and location variables and the serial number data stored in the NVRAM 94. Thereafter, at block 280 the microprocessor 54 points to the city and state data stored in the NVRAM 94 during the set up mode. Thereafter, at blocks 282, 284 and 286, the microprocessor repeats steps 274, 276 and 278 so as to create a bit map image of the city and state data. At block 288, the microprocessor 54 points to the zip code information identifying the mailing post office and at blocks 290, 292 and 294 repeats the operations of blocks 274, 276 and 278 so as to create a bit map image of the zip code information for the mailing post office. At block 296 the microprocessor 54 points to the date data stored in the non-volatile RAM 94 and entered during the set up mode and at block 298, 300 and 302 repeats the steps of blocks 274, 276 and 278 to create a bit map image of the date information to be printed on the stamp. Thereafter, at a block 304, the microprocessor 54 returns to the system routine shown in FIG. 13.

When the print stamp routine shown in FIG. 18 is called by the system routine, the microprocessor 54 at a block 306 calls a say busy routine to set a print flag that signals to the automatic data entry system that no data can be received. Thereafter, at block 308, the microprocessor 54 calls the create variable image routine shown in FIG. 19 so as to create a bit map image of the variable information to be printed on a stamp in the static RAM 60. Upon returning from the variable image routine, the microprocessor 54 at block 310 calls a print routine which causes the microprocessor 54 to load the data stored in the static RAM, i.e., the bit map image of the information to be printed on the stamp, to the thermal print head 50 a row at a time while controlling the stepper motor 52 to advance the paper stock so that the information may be printed on a stamp. After completing the call print routine, the microprocessor 54 at block 312 clears the print flag and returns to the calling routine at block 314.

Figure 19:
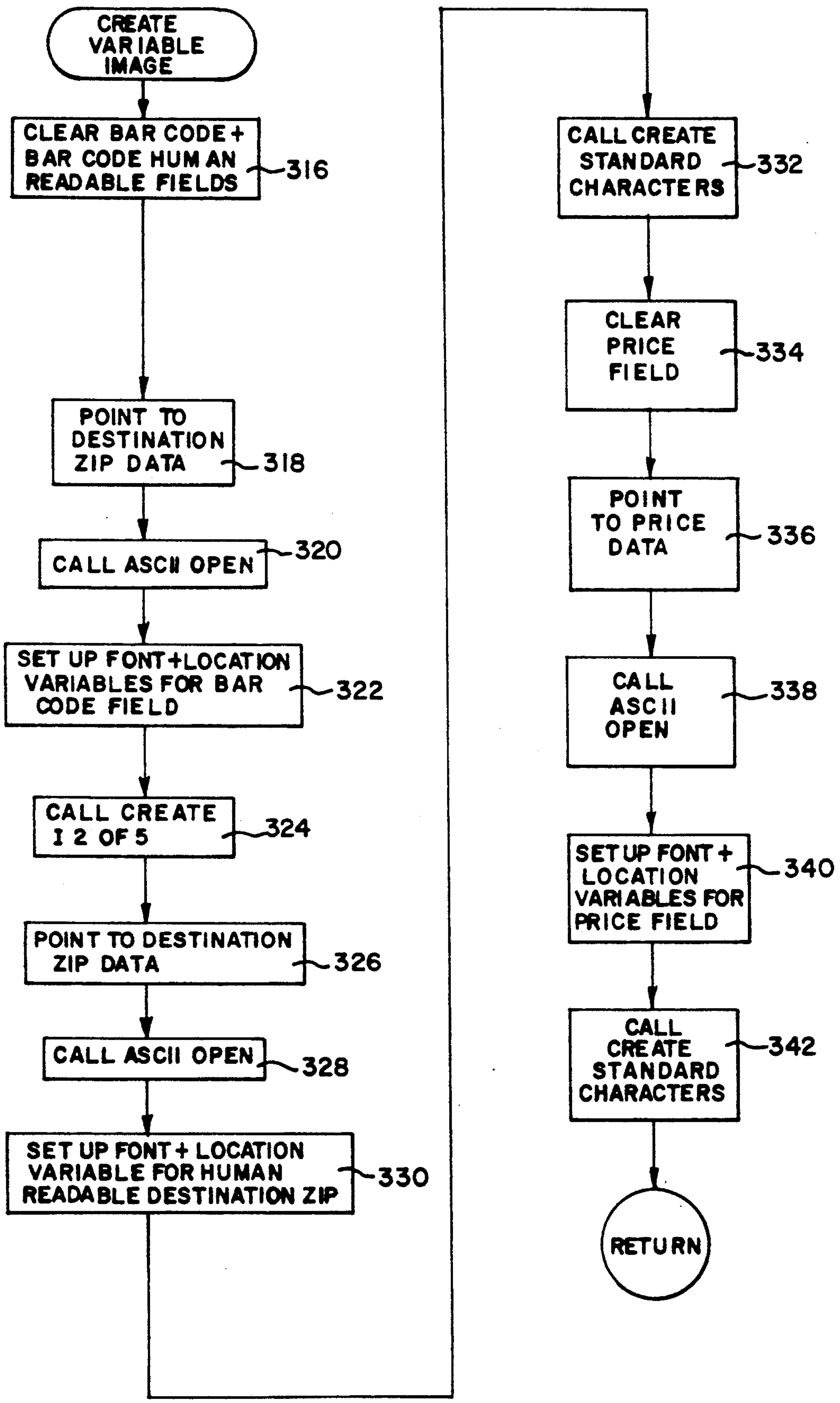
FIG. 19 is a create variable image routine called by the print stamp routine shown in FIG. 18.

As shown in FIG. 19, when the microprocessor 54 enters the create variable image routine, the microprocessor 54 at block 316 clears the bar code and bar code human readable fields for the destination zip code in the image memory portion of the SRAM 60 so that a bit map image of the new destination zip code information may be entered into the image memory. Thereafter, at block 318, the microprocessor 54 points to the destination zip code data stored in the SRAM 60 as received from the automatic data entry system 106. At block 320 the microprocessor 54 calls the ASCII open routine to open a file and at block 322 the microprocessor 54 sets up the font and location variables for the bar code field of the zip code. At block 324, calls a create routine to generate a bit map image of the bar code in the image portion of the SRAM 60. At block 326, the microprocessor 54 points to the destination zip code data entered from the automatic data entry system 106 and stored in the static RAM 60. Thereafter, the microprocessor 54 at blocks 328, 330 and 332 opens a file for the zip code data; sets up the font and location variables for the human readable zip code destination information and creates a bit map image of the human readable zip code destination information in the image portion of the SRAM 60. At block 334, the microprocessor clears the price field area of the image memory in the static RAM 60 and at block 336 points -Lo the price data. At blocks 338, 340 and 342, the microprocessor 54 opens a file for the price data; sets up font and location variables for the price field and creates a bit map image of the price information from the price data and the font and location variables. Thereafter, the microprocessor 54 returns to the print routine shown in FIG. 18.

When the self test key 150 is pressed, the microprocessor 54 enters a self test mode as shown in FIG. 20.

Upon entry of the self test routine, the microprocessor 54 at block 344 calls the say busy routine to set a busy flag. Thereafter, at block 346 the microprocessor 54 controls the LCD display 82 to display a "SELF TEST" message. At block 348 the microprocessor 54 sets the price data to "$0.00" and at block 350 the microprocessor sets the destination zip code data equal to the zip code associated with the post office of mailing. At block 352, the microprocessor 54 calls the create variable image routine as shown in FIG. 19 as discussed above so as to create a bit map image of the test data in the SRAM 60. Thereafter, at block 354 the microprocessor sets a SELF TEST flag and at block 356 calls the print routine shown in FIG. 18. Upon completion of the print routine, the microprocessor 54 at block 358 clears the SELF TEST flag and returns to the system routine shown in FIG. 13.

Figure 21:
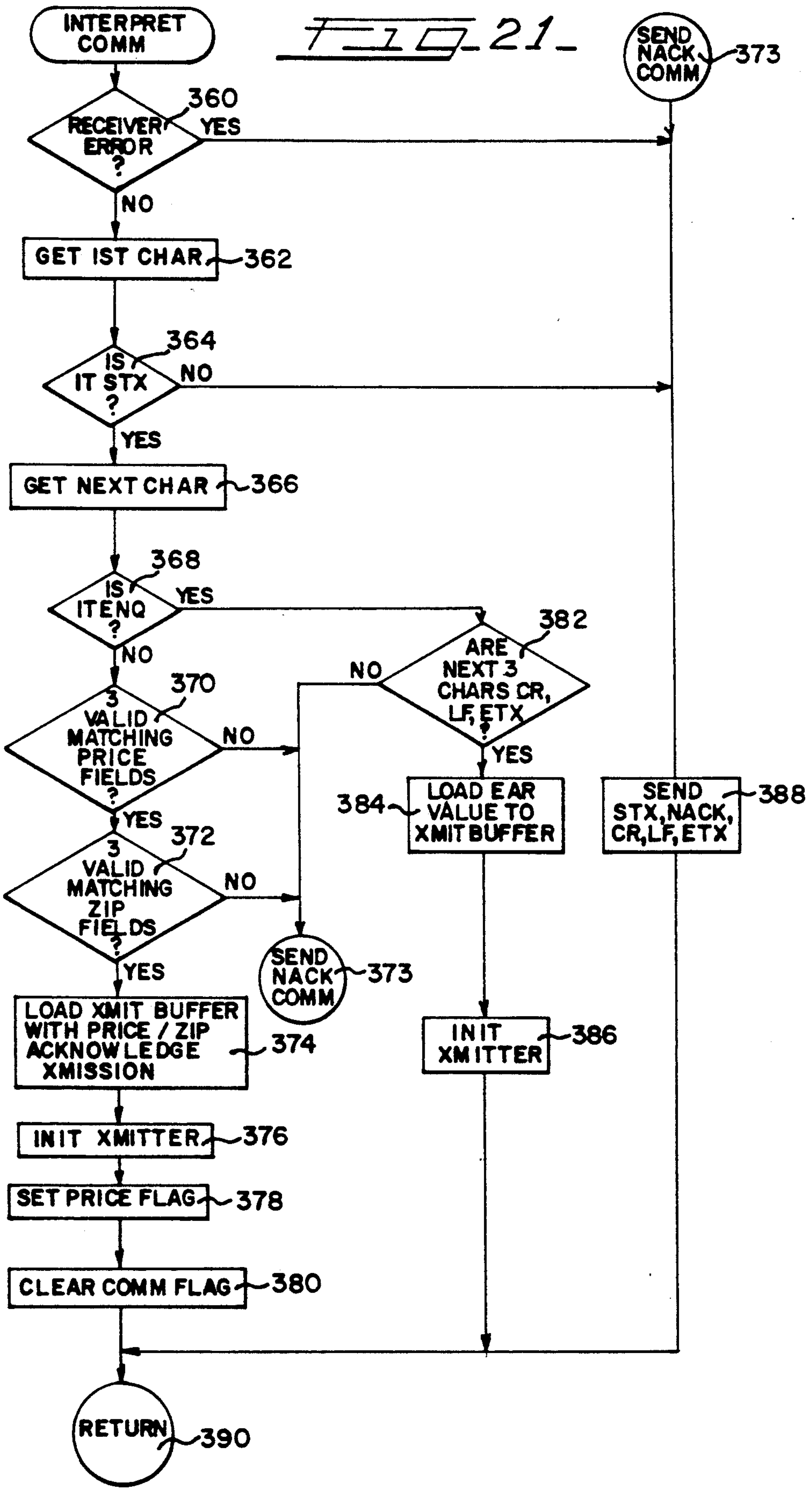

When the microprocessor 54 enters the interpret communication routine from the system routine, as shown in FIG. 21, the microprocessor at block 360 determines whether there is a receiver error. If there has been a receiver error, the microprocessor 54 sends a not acknowledge communication to the automatic data entry system 106 at a block 388 and returns to the system routine at block 390. If there have been no receiver errors, the microprocessor 54 proceeds to block 362 from block 360 to get the first character received from the automatic data entry system 106. At block 364 the microprocessor determines whether the first character is the start text character, STX, and if it is not proceeds to block 388 to send the not acknowledge communication back to the automatic data entry system 106. If the first character is the start text character, the microprocessor 54 at block 366 gets the next character received from the automatic data entry system 106. If the next character is not the ENQ character as determined by the microprocessor 54 at block 368, the microprocessor 54 at block 370 determines whether three valid matching price fields have been received from the automatic data entry system 106. If they have, the microprocessor 54 at block 372 determines whether three valid matching zip codes fields have been received from the automatic data entry system 106. If either three valid matching price fields have not been received or three valid matching zip code fields have not been received as determined by the microprocessor 54 at blocks 370 and 372, microprocessor 54 sends the not acknowledged communication back to the automatic data entry system 106 at a block 373. If the three valid matching price fields and three valid matching zip code fields have been received however, the microprocessor 54 at block 374 loads a transmit buffer with a price/zip code acknowledgement transmission. At block 376 the microprocessor 54 initializes the transmitter and at block 378 sets a price flag. Thereafter, at block 380, the microprocessor clears the communication flag and at block 390 returns to the system routine from which the print stamp routine is called to print a stamp with the variable information received from the automatic data entry system 106 since receipt of variable information from the automatic data entry system 106 is a request to print a stamp. If, the microprocessor 54 determines at block 368 that the second character is the ENQ character, the microprocessor 54 proceeds to block 382 to determine whether the next three characters represent the CR. LF and ETX characters representing a request from the automatic data entry system 106 for the value of an accumulation register EAR. If so, the microprocessor 54 at block 384 loads the value of the accumulation register EAR to the transmitter buffer and at block 386 initializes the transmitter so as to transmit the value of the accumulation register to the automatic data entry system 106. Thereafter, the microprocessor 54 returns at block 390 to the system routine.

Figure 22:
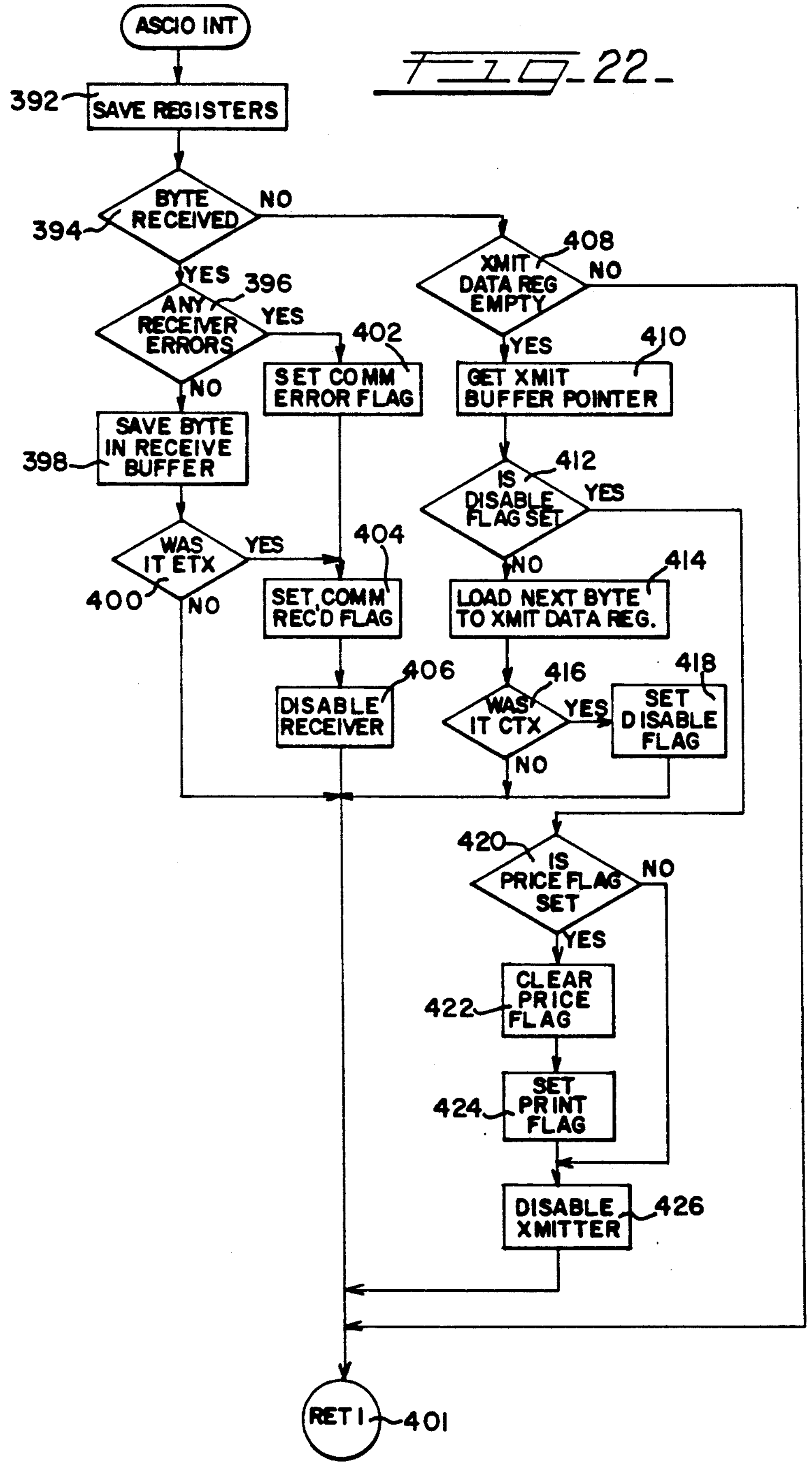
* and FIG. 22 is an interrupt routine for the printer shown in FIG. 1

When the microprocessor 54 receives an interrupt from the automatic data entry system 106, the microprocessor 54 enters the routine shown in FIG. 22. At a block 392, the microprocessor 54 saves the registers and at a block 394 determines whether a byte of information has been received from the automatic data entry system 106. If it has, the microprocessor 54 at block 396 determines whether there are any receiver errors and if not proceeds to block 398 to save the byte of information in the receiver buffer. At block 400 the microprocessor 54 determines whether the received byte of information represents the end of text character and if not returns from the interrupt. If the microprocessor at block 396 determines that there are receiver errors, the microprocessor 54 at block 402 sets a communication error flag and at block 404 sets a communication received flag. Thereafter at block 406 the microprocessor disables the receiver and returns from the interrupt at block 401. Blocks 404 and 406 are also implemented by the microprocessor 54 if the microprocessor 54 determines at block 400 that the byte of information in the receive buffer represents the end of text character. If the microprocessor 54 determines at block 394 that a byte of information has not been received, the microprocessor at block 408 determines whether the transmit data register is empty or not. If it is not empty the microprocessor 54 returns from the interrupt at block 408 and if the transmit data register is empty, the microprocessor 54 at block 410 gets the transmit buffer pointer. Thereafter, the microprocessor 54 determines whether the disable flag is set and if not, at block 414 loads the next byte of information to the transmit data register. After block 414, the microprocessor at block 416 determines whether the next byte of information was the end of text character and if not returns from the interrupt at block 401. If it was the end of text character, however, the microprocessor 54 at block 418 sets the disable flag and then returns from the interrupt at block 401. If the microprocessor 54 determines at block 412 that the disable flag is set, the microprocessor 54 proceeds to block 420 to determine whether the price flag is set. If the price flag is set, the microprocessor 54 at block 420 clears the price flag and at block 424 sets the print flag. Thereafter, the microprocessor 54 disables the transmitter and returns from the interrupt at block 401. If the microprocessor 54 determines that the price flag has not been set at block 420, the microprocessor 54 proceeds to block 426 to disable the transmitter and thereafter returns from the interrupt at block 401.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A printer for printing on a web of record members comprising:

means for powering up said printer;

means actuable by a user for entering at least one user command and data;

first storage means for storing data representing semi-fixed information to be printed; and means for controlling the storage of new print data in said first storage means in response to the receipt of a user command only within a predetermined period of time of the powering up of said printer.

2. A printer for printing on a web of record members as recited in claim 1 including:

second storage means for storing a bit map image of information to be printed; and means for creating in said second storage means once after the powering up of said printer a bit map image of that information represented by data stored in said first storage means.

3. A printer for printing on a web of record members as recited in claim 2 including:

means for entering variable data representing information to be printed; and means responsive to the entry of said variable data for creating in said second storage means a bit map image of information represented by said variable data.

4. A printer for printing on a web of record members as recited in claim 3 including means responsive to the entry of said variable data for printing said bit mapped information represented by data stored in said first storage means and said variable data.

5. A printer for printing on a web of record members as recited in claim 1 including means for displaying at least a portion of said information to be printed, said portion of information being formed of a plurality of fields; and means for storing a list associated with one or more of said fields of possible values for each associated field, said entry means including first means actuable by a user to increment the value of a field displayed on said display means to the next value in the list associated with said field; and second means actuable by a user for entering a save command, said control means being responsive to said save command to store the incremented value of said field displayed on said display means.

6. A printer for printing on a web of record members as recited in claim 5 wherein said display means includes means for identifying a field the value of which is incremented in response to said first user actuable means, said control being responsive to the actuation of said second user actuable means to control said identifying means to identify another field of said information.

7. A printer for printing on a web of record members as recited in claim 6 wherein said entry means includes third means actuable by a user to increment said display means to display a second portion of said information to be printed.

8. A printer for printing on a web of record members as recited in claim 7 wherein said control means is responsive to the actuation of said third user actuable means to store new print data representing the information displayed on said display means immediately prior to the actuation of said third user actuable means.

9. A printer for printing on a web of record members comprising:

a print head means actuable for printing information on said web of record members;

means for moving said web with respect to said print head;

means for displaying information to be printed, said information displayed including a plurality of fields;

means for storing a list associated with one or more of said fields of possible values for each associated field;

means acutable by a user for generating a first control signal; and processing means for controlling a plurality of operations of said processor, said processing means being responsive to said first control signal in a first mode of operation to increment the value of afield displayed on said display means to the next value in the list associated with said field and said processing means being responsive to said first control signal in a second mode of operation to control said web moving means.

10. A printer for printing on a web of record members as recited in claim 9 including means actuable by a user for generating a second control signal; said display means including means for identifying a field the value of which is incremented in response to said first control signal in said first mode of operation and said processing means being responsive to said second control signal to control said identifying means to identify another field of said information.

11. A printer for printing on a web of record members as recited in claim 10 wherein said processing means is responsive to said first control signal in said second mode of operation to control said web moving means to move said web in a first direction and said processing means being responsive to said second control signal in said second mode of operation to control said web moving means to move said web in a second direction opposite to said first direction.

12. A printer for printing on a web of record members as recited in claim 10 including means actuable by a user for generating a third control signal, said processing means being responsive to said third control signal in said first mode of operation to display different information to be printed.

13. A printer for printing on a web of record members as recited in claim 12 including means for moving said print head means into and out of a position with respect to said web for printing wherein said processing means is responsive to said first control signal in said second mode of operation to control said web moving means to move said web in a first direction, said processing means being responsive to said second control signal in said second mode of operation to control said web moving means to move said web in a second direction opposite to said first direction and said processing means being responsive to said third control signal in said second mode of operation to move said web into position with respect to said print head means for printing.

14. A printer for printing on a web of record members comprising:

a print head means actuable for printing information on said web of record members;

means for moving said web with respect to said print head;

first storage means for storing data to be printed;

input means actuable by a user for generating a first control signal;

means actuable by a user for generating a second control signal;

means for displaying information to be printed;

processing means for controlling a plurality of operations of said processor, said processing means being responsive to said first control signal in a first mode of operation to control the entry of data into said first storage means, said processing means being responsive to said second control signal in said first mode of operation for controlling aid display means and said processing means being responsive to said first control signal in said second mode of operation to control said web moving means to move said web in a first direction and said processing means being responsive to said second control signal in said second mode of operation to control said web moving means to move said web in a second direction opposite to said first direction.

15. A printer for printing on a web of record members comprising:

a print head means actuable for printing information on said web of record members;

means for moving said web with respect to said print head;

first storage mans for storing data to be printed;

means for displaying information to be printed;

means actuable by a user for generating a first control signal;

means actuable by a user for generating a second control signal;

means actuable by a user for generating a third control signal;

means for removing said web into and out of a position with respect to said print head means for printing; and processing means for controlling a plurality of operations of said processor, said processing means being responsive to said first control signal in a first mode of operation to control the entry of data into said storage means, said processing means being responsive to said second control signal in a first mode of operation for controlling said display means, said processing means being responsive to said third control signal in a first mode of operation to display different information to be printed, said processing means being responsive to said first control signal in a second mode of operation to control said web moving means to move said web in a first direction, said processing means being responsive to said second control signal in a second mode of operation to control said web moving means to move said web in a second direction opposite to said first direction and said processing means being responsive to said third control signal in a second mode of operation to move said web means into position with respect to said print head for printing.

16. A printer for printing on a web of record members comprising:

a print head means actuable for printing information on said web of record members;

means for moving said web with respect to said print head;

means for storing a list of data representing printable information;

means for displaying information to be printed, said information being represented by data in said list;

means actuable by a user for generating a control signal; and processing means for controlling a plurality of operations of said printer including said display means and said moving means, said processing means being responsive to said control signal in a first mode of operation to scroll said data list to control said display to display information associated with data subsequent in said list to data associated with information displayed prior to the generation of said control means and said processing means being responsive to said control signal in a second mode of operation to control said moving means to move said web with respect to said print head.

17. A printer for printing on a web of record members as recited in claim 16 wherein said information displayed includes a plurality of fields and including means for storing a list associated with one or more of said fields of possible values for each associated field, said processing means being responsive to said first control signal in said first mode to increment the value of a field displayed on said display means to the next value in the list associated with said field.

18. A printer for printing on a web of record members as recited in claim 17 including means actuable by a user for generating a second control signal; said display means including means for identifying a field the value of which is incremented in response to said first control signal in said first mode of operation and said processing means being responsive to said second control signal to control said identifying means to identify another field of said information.

19. A printer for printing on a web of record members as recited in claim 18 wherein said processing means is responsive to said first control signal in said second mode of operation to control said web moving means to move said web in a first direction and said processing means being responsive to said second control signal in said second mode of operation to control said web moving means to move said web in a second direction opposite to said first direction.

20. A printer for printing on a web of record members as recited in claim 18 wherein said processing means is further responsive to said second control signal to store the incremented value of said field displayed on said display means.

21. A printer for printing on a web of record members as recited in claim 18 including means actuable by a user for generating a third control signal, said processing means being responsive to said third control signal in said first mode of operation to display different information to be printed.

22. A printer for printing on a web of record members as recited in claim 21 including means for moving said print head means into and out of a position with respect to said web for printing wherein said processing means is responsive to said first control signal in said second mode of operation to control said web moving means to move said web in a first direction, said processing means being responsive to said second control signal in said second mode of operation to control said web moving means to move said web in a second direction opposite to said first direction and said processing means being responsive to said third control signal in said second mode of operation to move said web into position with respect to said print head means for printing.

23. A printer for printing on a web of record members comprising:

means for initializing said printer;

means actuable by a user for entering at least one user command and semi-fixed data;

first storage means for storing data representing information to be printed; and means for controlling the storage of new print data in said storage means in response to receipt of a user command only within a predetermined period of time of the initialization of said printer.

24. A printer for printing on a web of record members as recited in claim 23 including:

second storage means for storing a bit map image of information to be printed; and means for creating in said second storage means once after the initialization of said printer a bit map image of that information represented by data stored in said first storage means.

25. A printer for printing on a web of record members as recited in claim 24 including:

means for entering variable data representing information to be printed; and means responsive to the entry of said variable data for creating in said second storage means a bit map image of information represented by said variable data.

26. A printer for printing on a web of record members as recited in claim 25 including means responsive to the entry of said variable data for printing said bit mapped information represented by data stored in said first storage means and said variable data.

27. A printer for printing on a web of record members as recited in claim 23 including means for displaying at least a portion of said information to be printed, said portion of information being formed of a plurality of fields; and means for storing a list associated with one or more of said fields of possible values for each associated field, said entry means including first means actuable by a user to increment the value of a field displayed on said display means to the next value in the list associated with said field; and second means actuable by a user for entering a save command, said control means being responsive to said save command to store the incremented value of said field displayed on said display means.

28. A printer for printing on a web of record members as recited in claim 23 wherein said display means includes means for identifying a field the value of which is incremented in response to said first user actuable means and said control means is responsive to the actuation of said second user actuable means to control said identifying means to identify another field of said information.

29. A printer for printing on a web of record members as recited in claim 28 wherein said entry means includes third means actuable by a user to increment said display means to display a second portion of said information to be printed.

30. A printer for printing on a web of record members as recited in claim 29 wherein said control means is responsive to the actuation of said third user actuable means to store new print data representing the information displayed on said display means immediately prior to the actuation of said third user actuable means.

31. A method of operating a printer that prints on a web of record members and includes means for entering data comprising:

initializing said printer upon the application of power to said printer;

entering a control signal within a predetermined period of time of the initialization of said printer to operate in a set-up mode;

entering semi-fixed information in said set up mode;

creating in a memory once after the initialization of said printer, a bit map image of said semi-fixed information.

32. A method of operating a printer as recited in claim 31 including the steps of entering variable information; and creating in said memory a bit map image of said variable information each time said variable information is entered.

33. A method of operating a printer as recited in claim 32 including the step of printing said bit mapped information each time said variable information is entered.

* * * * *